July 4, 1950            E. K. MALME            2,513,577
PASTEURIZER
Filed July 17, 1946
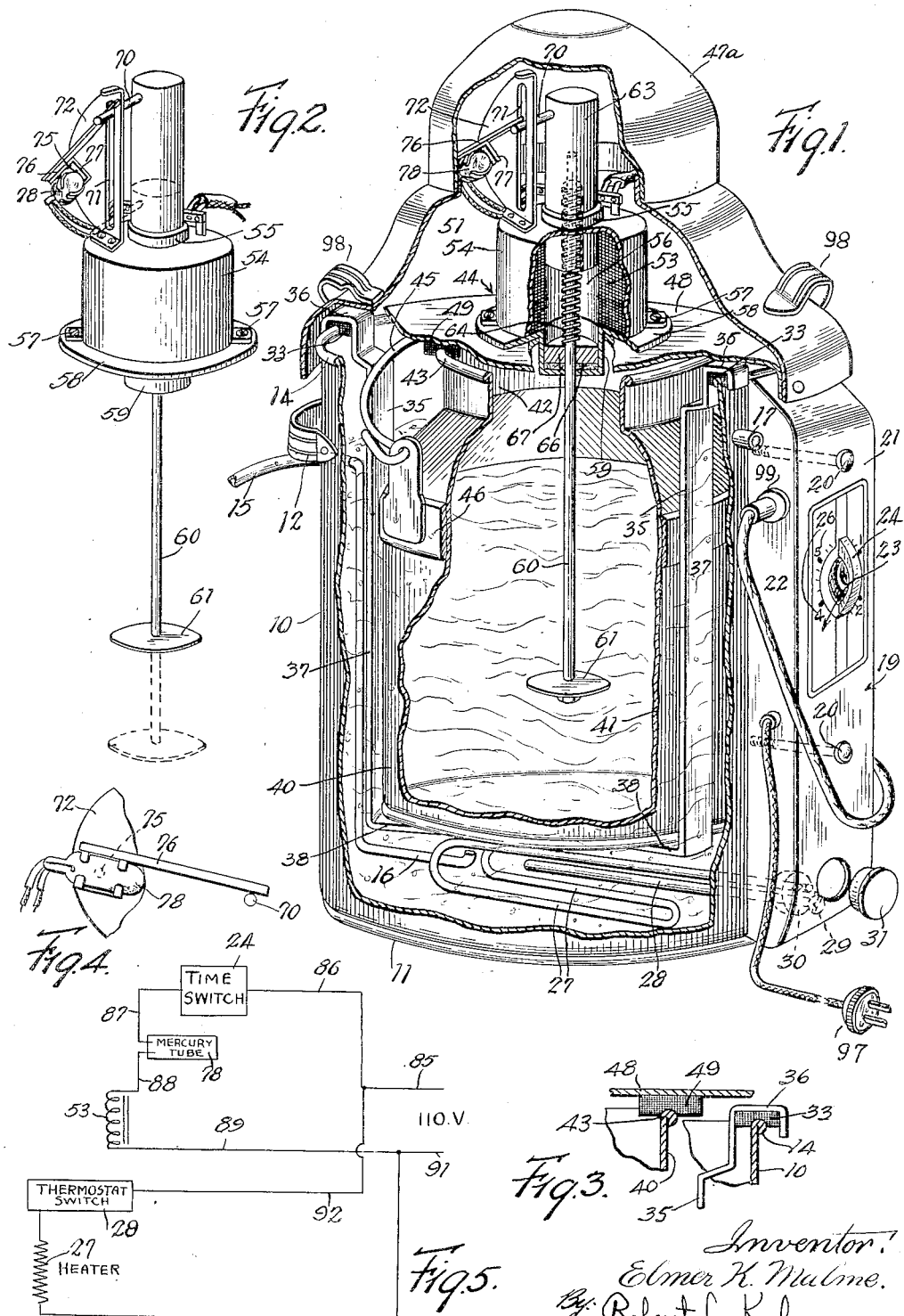
Inventor:
Elmer K. Malme.
By Robert L. Kahn
Atty.

Patented July 4, 1950

2,513,577

UNITED STATES PATENT OFFICE 2,513,577

PASTEURIZER

Elmer K. Malme, Chicago, Ill., assignor to Guard-It Manufacturing Co., Chicago, Ill., a corporation of Illinois Application July 17, 1946, Serial No. 684,159

6 Claims. (Cl. 259—113)

This invention relates to a pasteurizer and particularly to a pasteurizer for treating small quantities of milk of the order of several gallons. While the invention may be used for agitating liquids, it is particularly adapted for use in pasteurizing milk and will be so described. It is understood, however, that the application to pasteurization is merely by way of example rather than by way of limitation.

There has long existed a demand for a simple and economical pasteurizer to handle relatively small quantities of milk, such as might be used by one family. While various attempts have been made to supply such a demand, such attempts in the main have been unsuccessful.

The greatest demand for such pasteurizers is generally, though not necessarily, to be found in rural areas. A pasteurizer to be satisfactory, particularly in rural areas, must be mechanically simple and be free from any reasonable possibility of breakdown. In addition, it is necessary that the pasteurizer be rugged and be capable of being easily and quickly sterilized. The portions of the pasteurizer which come into contact with milk should have relatively simple surfaces which may be cleaned easily. In particular, the container for the milk should be simple and preferably readily available for replacement.

A structure embodying the present invention is desirable from many points of view. From a manufacturing angle, the entire structure is so simple as to require minimum expense in tooling for production and assembly. From the user's point of view, the structure requires no upkeep and is mechanically so simple as to make the same substantially foolproof. In addition, the structure operates in a simple and effective manner.

In order to explain the invention, reference will now be made to the drawing wherein an exemplary embodiment of the invention is shown, it being understood, however, that many modifications may be made without departing from the spirit of the invention.

Figure 1 shows a perspective view with part broken away of a structure embodying the present invention.

Figure 2 is a detail of the motor portion of the system.

Figure 3 is a broken detail illustrating the arrangement of gaskets.

Figure 4 is a detail showing the motor switch.

Figure 5 is a wiring diagram of the system.

Outer pail 10 of metal or any other similar material has bottom 11, preferably flat. This pail may assume any one of a number of shapes but a simple cylindrical pail is preferred. Pail 10 is shown as provided with handle 12 for carrying the entire device.

Pail 10 has edge 14 preferably beaded. At any suitable point at the side of the pail, inlet pipe 15 is provided having portion 16 extending to the bottom of the pail. Outlet drain pipe 17 is also provided, this outlet passing through the side of the pail at any preferred spot, here shown as somewhat higher on the pail side than inlet 16. The two pipes may be of any desired material such as brass or steel. The inlet pipe may be partly of flexible hose if desired.

Along one side of pail 10, control panel 19 is provided. This panel may be made in any desired shape and may be retained in position against the pail side in any suitable manner such as by bolts 20 engaging threaded bosses on the pail side. Panel 19 has front face 21 and sides 22, only one of which appears. Front face 21 of panel 19 carries time switch 23 having control handle 24 on the front thereof, this time switch having suitable scale indications 26 for selecting any desired time interval. Inasmuch as time-controlled electric switches are old, no attempt will be made to describe any detailed structure. The time switch is preferably of the type wherein movement of the control handle to a selected scale indication serves to close a switch and, at the same time, wind a clock spring.

Disposed near the bottom of pail 10 is electric heating element 27. This electric heating element is preferably in the form of a metal tube within which there may be sealed suitable heating coils. Such heating elements for operating in liquid are well known and available on the market. The heating element itself may be disposed in any one of a number of ways and is preferably shaped to extend above bottom 11 of the pail. The heating element is preferably supported from the side of the pail near the bottom thereof and may conveniently pass through the pail side at the lower portion of control panel 19. In proximity to the heating element is thermostat 28 also passing through the pail side at the portion thereof under the control panel. Thermostat 28 has adjusting means 29. The thermostat and heating element together may be disposed as a single unit sealed in the pail side by suitable plug 30. Cover 31 in the panel is provided for access to the thermostat for the purpose of adjusting the same.

Covering beaded edge 14 of pail 10 is resilient gasket 33 of rubber or any other similar material.

It is preferred to have gasket 33 of substantial thickness and resilient for a purpose which will be apparent later. Resting on top of gasket 33 is cradle 35, this cradle having hooks 36 for extending over the gasket. The cradle has sides 37 and bottom portion 38 within which milk container 40 may rest. Milk container 40 may be of any desired construction and, in its simplest form, may be a conventional metal container common on farms. Such container has generally cylindrical body 41 with wide mouth 42 and beaded edge 43. The container is customarily provided with handle 45 carried by reinforcing strap 46 disposed around the waist of the container.

As a rule, such containers are usually provided with suitable covers for storage and transportation of cream or milk. Inasmuch as such cover is not necessary for the operation of the pasteurizer, it is not shown.

As shown in Figure 3, beaded edge 43 of the milk container is normally disposed somewhat higher than beaded edge 14 of water pail 10. On beaded edge 43 rests a dome-shaped motor assembly generally designated as 44. This assembly comprises casing 47 having removable cap 47a. The bottom of casing 47 has rigidly attached thereto, as by rivets, cover plate 48. Plate 48 may be generally flat except for the turned peripheral portion and carries cemented thereto resilient gasket 49 adapted to fit over beaded edge 43. Gasket 49 is preferably of rubber and this gasket, as well as gasket 33, are both designed so that substantial bouncing may occur.

It is obvious that beaded edge 43 does not necessarily have to be higher than beaded edge 14, as shown in Figure 3. However, this relationship is desired to simplify cover plate 48. In any event, cover plate 48 in its normal position clears hanger portion 36 of the cradle so that oscillations on the two gaskets may occur independently of each other.

Cover plate 48 cooperates with the dome to provide chamber 51 within which the motor is housed. This motor comprises solenoid winding 53 disposed within iron housing 54. Housing 54 carries sleeve 55 at the top concentric with center region 56 of winding 53. Housing 54 and winding 53 together form an electromagnet which is secured in any suitable fashion such as by bolts 57 to end plate 58. This plate is also preferably of soft iron and is secured to cover plate 48. Cover plate 48 is suitably apertured to accommodate well 59 extending down from end plate 58. Well 59 is apertured and has plunger rod 60 extending therethrough.

Plunger rod 60 normally extends down into milk container 40 and carries agitator 61 at the end thereof. This may consist of a simple disc suitably attached to the rod. Other constructions may be utilized. Rod 60 may be of any suitable material, either plastic or metal, and is preferably polished so that it may be maintained clean. Rod 60 may conveniently be of stainless steel or other metal which will normally have minimum corrosion. Rod 60 extends through well 59 and is attached to armature 63 at the upper end thereof. This armature is of soft iron and consists of a simple cylinder. Disposed around rod 60 inside of winding 53 is coil spring 64. This spring is disposed around rod 60 and, in order to conserve space, may extend into recessed portion 65 of armature 63. A tight seal is provided by felt washer 66 disposed within well 59. This washer is disposed in well 59 with rod 60 passing through it. Heavy metal washer 67 disposed above washer 66 serves as a retainer for the bottom end of spring 64. Thus, a liquid tight seal for rod 60 is provided.

Suitable switching means are provided for controlling the energization of winding 53. This comprises the following. Armature 63 carries, preferably at the upper end thereof, pin 70 normally operating within slot 71 of bracket 72 rigidly supported on housing 54. Pivotally mounted at 75 on bracket 72 is arm 76 having mounting plate 77 upon which is carried mercury switch 78. By suitable choice of the pivot position, as well as distribution of weight, arm 76 normally tends to drop to the position shown in Figure 4 where the mercury switch is open and the arm is down in its lower position. It will be noted that arm 76 is long enough to reach beyond pin 70. By disposing the free end of arm 76 above the pin, a satisfactory driving connection is established.

As will be evident from the drawings, the normal position of the motor is such as to dispose the armature in an upper position with the switch normally closed.

Referring to Figure 5, the wiring diagram of the system is shown. Thus, main wire 85 is connected by wire 86 to time switch 24. The other terminal of the time switch is connected by wire 87 to mercury switch 78. Mercury switch 78 has its other terminal connected by wire 88 to winding 53 of the solenoid, and this winding is connected by wire 89 to wire 91 forming the other main lead. Connected to wire 85 by lead 92 is thermostat 28 and heater 27 in series.

Upon energization of the circuit, current will flow through the mercury switch and the time switch, assuming that the latter is closed, and cause the electromagnet to be energized. The downward travel of the armature will permit the mercury switch to open, thus deenergizing the winding and causing spring 64 to return the armature to an upper position. It is obvious that the mechanism will oscillate at a rate determined by the physical constants of the system. It is not necessary that the mercury switch be in a closed position when the apparatus is idle. If the switch is normally open, oscillation may be started by bouncing or initially agitating the device whereupon oscillations will continue. It is preferred, however, to have the device self-starting so that there will be no question of continued operation.

In order to use the device as a pasteurizer, water is run into pail 10. Thereafter, the milk can containing a suitable quantity of milk is disposed in position and the entire apparatus disposed as shown in Figure 1. By connecting plug 97 to a suitable receptacle, current through the thermostatic switch and heater is provided for heating the water. The thermostat is set to a suitable temperature, usually 142 or 143 degrees F. It is understood that the thermostat will open the heater circuit when the water temperature has reached a desired value, such as 143 degrees, and will turn the circuit on again when the water temperature has dropped, the temperature differential in pasteurizers usually being of the order of one or two degrees. Assuming that the water is hot, the time switch is closed and is set to remain closed for a suitable time, such as one-half hour. The closure of the time switch serves to initiate agitator operation.

The vertical reciprocation of agitator 61 together with motor reaction will result in a gentle vertical oscillation of milk container 40. Milk container 40, together with cradle 35, will oscillate substantially as a unit upon resilient gasket 33. The vertical oscillation of the milk container will provide a piston action in the water and result in sufficient agitation of the water to prevent variations in temperature throughout the water. It is particularly important in a pasteurizer that the formation of excessively hot layers of water adjacent the milk container surface be avoided. This is efficiently accomplished by the rocking action of the milk container. Agitator 61 will also insure that all parts of the body of milk are heated to the desired temperature.

When pasteurization is complete, cold water may be run into the inlet and excess water drained from the outlet. While the inlet and outlet pipes may be dispensed with, it is preferred to provide such connections and eliminate the necessity for pouring water in the top. In that way, the possibility of contamination with milk is avoided and also the necessity for opening the pasteurizer prior to removal of the milk is avoided.

After the completion of the pasteurization and the cooling of the milk, the entire motor assembly may be removed by handles 98. Milk container 40 may thereupon be removed and drained of its milk content.

It is evident that the entire structure is simple and has a minimum of parts. In addition, the necessity for fine machine work or complicated tools and dies is avoided. Assembly is a relatively simple operation. Removal of cap 46 gives access to the mechanism and will permit renewal of the mercury switch unit in case of damage to the switch or leads. It is evident that the electromagnet itself has nothing to get out of order.

Instead of pasteurization, it is possible to use the device for mixing liquids generally. It is also possible to use the device as an ice cream freezer. Thus, chipped ice may be disposed within pail 10. A suitable ice cream mix may be disposed in pail 40 and thereafter the motor started. In such case, plug 99 will be connected to the source of current. Plug 97 need not be used, thereby cutting the heater and thermostat switch out of the system. The device may also be used as a churn for making butter.

The motor system disclosed here may be varied without departing from the spirit of the invention. Thus, gravity may be used to bias the armature to a bottom position, from which position magnetic attraction may be relied upon to move the armature to its other position. Furthermore, the switching means may be varied. In general, however, the system is designed so that the motor as a whole will generate continuous oscillations. For a small pasteurizer, the frequency of such oscillations may be of the order of about ten cycles per minute.

What is claimed is:

1. A pasteurizer comprising inner and outer nested pail-shaped containers for milk and liquid bath respectively, resilient means for supporting said inner container in said outer container, a cover plate for said inner container, resilient means cooperating with the rim of said inner container for supporting said cover plate, said cover plate being readily removable, a solenoid carried by said cover plate with the solenoid axis vertical, a rod carried by said cover plate for vertical reciprocation, said rod having one end portion above said cover plate with an armature attached thereto, said rod extending down into said inner container and carrying an agitator at the lower end thereof, means for biasing said armature to one position from which position solenoid energization moves the armature, an electric switch carried by said cover plate for controlling said solenoid circuit, and mechanical means interconnecting said switch and armature for alternately opening and closing said solenoid circuit in proper phase to armature movement for maintaining continuous armature oscillation, said mechanism being designed so that said oscillation is at low frequency and motor action and reaction will generate gentle relative movement between containers when normally in use to assure uniform temperatures in milk and bath respectively.

2. A pasteurizer comprising inner and outer nested pail-shaped containers for milk and liquid bath respectively, means including resilient pads for supporting said inner container from rim of said outer container, a cover plate for said inner container, resilient means for supporting said cover plate upon the rim of said inner container, a solenoid carried by said cover plate substantially at the center thereof with the solenoid axis vertical, a rod carried by said cover plate for vertical reciprocation, said rod extending above and below said cover plate and carrying an armature and agitator at the top and bottom ends respectively, spring means for biasing said armature to one position from which position the solenoid attracts said armature, an electric switch mounted upon said solenoid for controlling said solenoid circuit, means connecting said armature and switch for alternately opening and closing said solenoid circuit in proper phase to armature movement for maintaining continuous armature oscillation, said mechanism being designed so that said oscillation is at low frequency and motor action and reaction will generate gentle relative movement between containers in normal use to assure uniform temperature in milk and bath respectively.

3. The structure according to claim 2 wherein said electric switch comprises a mercury switch pivotally mounted and wherein said connection comprises a finger carried by said armature and a rod attached to said mercury switch.

4. A pasteurizer comprising inner and outer nesting pail-shaped containers for milk and liquid bath respectively, means including resilient pads for supporting said inner container from the rim of said outer container, a cover plate for said inner container, a resilient pad between said cover plate and rim of said inner container whereby said cover plate may rest upon said inner container rim, a solenoid carried by said cover plate with the solenoid axis vertical, a rod carried by said cover plate for vertical reciprocation and carrying an armature and agitator at the two ends of said rod, said armature being movable within said solenoid, means for biasing said armature to one position from which position solenoid energization moves the armature, a bracket carried by said plate, a mercury switch pivotally mounted upon said bracket and including a rod, a pin carried by said armature for moving said rod, said mercury switch controlling the solenoid circuit and being alternately opened and closed in proper phase by armature movement for maintaining continuous oscillation, said mechanism being designed so that said oscillation is at low frequency and motor action and reaction will generate gentle relative movement between containers when normally in use.

5. A slow speed motor for a milk pasteurizer of the type having a wide mouthed pail in which the pasteurizer contents are disposed, said motor comprising a cover plate adapted to rest upon the rim of said pail, a solenoid disposed upon the upper face of said cover plate with the solenoid axis vertical, a rod mounted for vertical reciprocation in said plate, said rod carrying an armature and milk agitator at the two ends thereof, spring means for biasing said armature to one position from which position said solenoid when energized moves said armature, an electric switch for controlling the solenoid circuit carried by said cover plate and mechanical means connecting said armature and switch for operating said switch in proper phase with said armature to maintain said motor continuously in oscillation.

6. The motor of claim 5 wherein said switch is of the mercury type and said mechanical means is of the lost motion type.

ELMER K. MALME.

REFERENCES CITED

The following references are of record in the file of this patent:

UNITED STATES PATENTS

| Number | Name | Date |
|---|---|---|
| 887,923 | Crandall | May 19, 1908 |
| 1,134,913 | Schlotterbeck | Apr. 6, 1915 |
| 1,708,729 | Klein | Apr. 9, 1929 |
| 1,776,405 | Wilsey | Sept. 23, 1930 |
| 1,977,454 | Price | Oct. 16, 1934 |
| 2,109,694 | Goble | Mar. 1, 1938 |
| 2,251,203 | Ramsay | July 29, 1941 |
| 2,258,210 | Maxwell | Oct. 7, 1941 |
| 2,317,480 | Peters | Apr. 27, 1943 |
| 2,371,807 | Dalzell et al. | Mar. 20, 1945 |

FOREIGN PATENTS

| Number | Country | Date |
|---|---|---|
| 111,366 | Great Britain | Dec. 15, 1916 |